United States Patent
Edwards

(10) Patent No.: US 9,292,197 B2
(45) Date of Patent: Mar. 22, 2016

(54) METHOD, APPARATUS AND COMPUTER PROGRAM PRODUCT FOR FACILITATING THE MANIPULATION OF MEDICAL IMAGES

(75) Inventor: Cliff Edwards, Delta (CA)

(73) Assignee: McKesson Financial Holdings, Hamilton (BM)

( * ) Notice: Subject to any disclaimer, the term of this patent is extended or adjusted under 35 U.S.C. 154(b) by 420 days.

(21) Appl. No.: 13/435,903

(22) Filed: Mar. 30, 2012

(65) Prior Publication Data
US 2013/0257729 A1 Oct. 3, 2013

(51) Int. Cl.
| G06F 3/033 | (2013.01) |
| G06F 3/038 | (2013.01) |
| G06F 3/0354 | (2013.01) |
| G09G 5/08 | (2006.01) |
| G06F 3/0488 | (2013.01) |
| G06F 3/044 | (2006.01) |
| G06F 3/0484 | (2013.01) |
| G06F 3/0485 | (2013.01) |

(52) U.S. Cl.
CPC ........ *G06F 3/04883* (2013.01); *G06F 3/03543* (2013.01); *G06F 3/044* (2013.01); *G06F 3/0485* (2013.01); *G06F 3/04845* (2013.01); G06F 2203/04806 (2013.01)

(58) Field of Classification Search
CPC ... G09G 2380/08; G06F 3/0227; G06F 3/023; G06F 3/037
See application file for complete search history.

(56) References Cited

U.S. PATENT DOCUMENTS

| 6,323,846 B1 * | 11/2001 | Westerman et al. .......... 345/173 |
| 8,279,176 B2 * | 10/2012 | Krah .................... G06F 3/03543 345/163 |
| 9,041,651 B2 * | 5/2015 | Yasutake ................. G06F 3/033 345/163 |
| 2006/0125803 A1 * | 6/2006 | Westerman et al. .......... 345/173 |
| 2009/0051671 A1 * | 2/2009 | Konstas ........................ 345/174 |
| 2010/0117963 A1 * | 5/2010 | Westerman ......... G06F 3/03543 345/163 |
| 2010/0201626 A1 * | 8/2010 | Krah et al. ..................... 345/163 |
| 2010/0245246 A1 * | 9/2010 | Rosenfeld et al. ............. 345/163 |
| 2011/0080341 A1 * | 4/2011 | Helmes et al. ................. 345/163 |
| 2011/0109552 A1 * | 5/2011 | Yasutake ............. G06F 3/03543 345/163 |

(Continued)

OTHER PUBLICATIONS

Portable Touch Mouse Technology | Microsoft Hardware; Mice that work—and work wonders [online][retrieved Oct. 15, 2014]. Retrieved from the Internet: <URL: http://www.microsoft.com/hardware/en-us/touch-technology>. (dated 2014) 2 pages.

*Primary Examiner* — Kent Chang
*Assistant Examiner* — William Lu
(74) *Attorney, Agent, or Firm* — Alston & Bird LLP

(57) ABSTRACT

A method, apparatus and computer program product are provided to facilitate the manipulation of medical images. In the context of a method, the position of a user's hand upon a touch sensitive input device may be determined. Determining the position may include detecting instances in which the user's hand is in either a first or second positions upon the touch sensitive input device. In the first position, the method may also include enabling a first image manipulation mode in which a first image manipulation operation is enabled and interpreting a first type of input to be directing the first image manipulation operation. However, in the second position, the method may include enabling a second image manipulation mode in which a second image manipulation operation is enabled and interpreting the first type of input to be directing the second image manipulation operation instead of the first image manipulation operation.

15 Claims, 4 Drawing Sheets

(56) References Cited

U.S. PATENT DOCUMENTS

2011/0227947 A1* 9/2011 Benko et al. .................. 345/650
2012/0092253 A1* 4/2012 Irani et al. .................... 345/157
2012/0131514 A1* 5/2012 Ansell et al. .................. 715/863
2013/0038534 A1* 2/2013 Krah et al. .................... 345/163
2013/0120260 A1* 5/2013 Piot et al. ...................... 345/163

* cited by examiner

METHOD, APPARATUS AND COMPUTER PROGRAM PRODUCT FOR FACILITATING THE MANIPULATION OF MEDICAL IMAGES

TECHNOLOGICAL FIELD

In accordance with an example embodiment, a method, apparatus and computer program product are provided for displaying medical images and, more particularly, for facilitating the manipulation of medication images.

BACKGROUND

Medical imaging often includes creating images and/or video sequences of the human body or parts of the human body for clinical purposes such as examination, diagnosis and/or treatment. These images may be acquired by a number of different imaging modalities including, for example, ultrasound (US), magnetic resonance (MR), positron emission tomography (PET), computed tomography (CT), mammography (MG), digital radiology (DR), computed radiology (CR) or the like. In a number of example medical imaging workflows, such as in the case of a picture archiving and communications system (PACS), a digital image data file for a patient may include one or more acquired images of the patient along with information that may reside with or otherwise accompany the images. This information may include, for example, a study identifier (ID) as well as patient information such as the patient's name, demographic information, medical record number or the like.

A PACS may permit the digital imaging data file to be viewed, such as for diagnostic purposes, and/or archived for subsequent viewing and/or processing. A PACS workstation may present images or series of related images on the display within a software construct called a viewport. While viewing a medical image, a healthcare provider may wish to manipulate, e.g., modify, the image within a viewport to better view a portion of the image or to adjust the image for better visualization of the pixels. Examples of image manipulation include a window and level adjustment operation, a panning operation, and a zoom operation. A healthcare provider may also wish to navigate a series of related images within a viewport, typically involving a scroll operation. Typically, a healthcare provider who is viewing medical images on a PACS workstation utilizes a mouse in order to provide input regarding manipulation of the image, or navigation of images within a viewport. A conventional mouse includes left and right mouse buttons so as to allow the user to provide discrete input such as a selection, or command. A conventional mouse also incorporates a wheel, generally positioned between the left and right buttons, that can be rotated either forwardly or rearwardly to provide further input such as varying a single parameter through a range. A mouse also provides simultaneous two parameter input by movement forward and back or left to right on a support surface. In this regard, the position of the cursor on the display may be controlled by movement of the mouse. An image may be selected and moved from or to a viewport by actuating the left mouse button and moving the mouse followed by release of the left mouse button at the desired target display location. Thereafter, the right mouse button may be actuated to indicate that the medical image is to be manipulated. Further input regarding image or viewport manipulation that is to be performed may be provided by rotating the wheel in either of the two opposed directions or by moving the mouse while continuing to depress the right mouse button.

Because of the number of different types of image manipulation operations, a mouse may be unable to provide a sufficient number of distinct inputs in order to individually select each of the different image manipulation operations and to then provide the input necessary to effect a selected image manipulation operation. By way of example, the window and level adjustment operation and the panning operation each require input to simultaneously adjust two variables. In this regard, a mouse may be positioned such that the cursor overlies a particular medical image that has already been zoomed such that its magnification makes it larger than the bounds of the containing viewport. By actuating the left mouse button and then moving the mouse while continuing to actuate the left mouse button, the image may be panned by being dragged in the X and Y directions within the viewport in which it is currently displayed, showing portions of the image not currently visible. However, the actuation of the right mouse button and the subsequent movement of the mouse while the right mouse button remains actuated may cause a window and level adjustment operation to be implemented. In this regard, the window and level adjustment operation allows two parameters to be controlled based upon the movement of the mouse in the X and Y directions while the right mouse button remains actuated.

As noted above, three operations, e.g., selecting and moving an image into or out of the viewport, panning the image within the viewport, performing a window and level adjustment operation, requiring selection with a mouse button and simultaneous X and Y motion of the mouse have been described, and only two mouse buttons are available, the left and right buttons. In this example the select and move an image to or from a viewport operation, and the pan image within a viewport operation both require the left mouse button to select the operation. The panning operation may not typically be performed based upon input provided only by the mouse. Instead, a healthcare provider who is viewing the image and desires to pan the image may be required to initially depress a predefined keyboard shortcut modifier key, such as the shift key, in order to activate the panning operation and to distinguish subsequent mouse input from comparable mouse input provided in conjunction with the operation relating to selecting and moving an image into and out of a viewport. Once the keyboard shortcut modifier key has been actuated, the healthcare practitioner may select to pan the medical image by actuating the left mouse button while the cursor overlies the image and then moving the mouse while the left mouse button remains actuated in order to perform the panning operation. The use of a keyboard shortcut modifier key makes the performance of a panning operation more complex and may be particularly challenging in instances in which the healthcare practitioner is not only manipulating an image displayed by a PACS workstation, but concurrently operating a speech microphone in order to dictate a report that describes or references the medical image. Indeed, the healthcare practitioner may have to set down the speech microphone in order to pan the medical image which may, in turn, decrease the efficiency with which the healthcare practitioner completes the report. Alternatively, the healthcare practitioner may have to perform an awkward movement in an effort to both depress the keyboard shortcut modifier key while still holding the speech microphone.

Other types of image manipulation operations require adjustment of a single variable. For example, a scroll operation and a zoom operation each require change of a single variable over a range. In one example, an image viewport may be selected by hovering the mouse cursor over the viewport or by left clicking on the viewport and the series of images stacked for display in the viewport may be scrolled through the viewport by rotating the mouse wheel in a respective direction, while the mouse cursor remains over the viewport. As described above in conjunction with the panning operation, the limited number of inputs that may be provided by a mouse may be unable to provide the control inputs for a zoom operation. Instead, in order to zoom, a healthcare practitioner may be required to actuate a keyboard shortcut modifier key, such as the control key, in order to actuate the zoom mode. The image displayed in the viewport being manipulated may then be zoomed to higher or lower magnification by rotating the mouse wheel in a respective direction, while the mouse cursor remains over the viewport. As described above, the actuation of the keyboard modifier key not only makes the image manipulation process more complex, but may be difficult to perform in instances in which the healthcare practitioner is also holding a speech microphone.

As an alternative to the use of keyboard shortcut modifier keys, radio buttons may be presented upon the display, such as within a dialog box or window, in order to permit the healthcare practitioner viewing the medical image to switch from a mode in which the scroll and move image to or from a viewport operations are performed in response to the actuation of the wheel and the left mouse button respectively to a mode in which the zoom and panning operations are performed in response to the actuation of the wheel and the left mouse button respectively by selecting the appropriate radio button. However, such a zoom and pan tool also complicates the image manipulation process by requiring additional and different kinds of user input. Additionally, a zoom and pan tool cannot generally permit an image to be both zoomed and panned without requiring selection of a zoom mode or a pan mode in the graphical user interface, which takes additional time. Another alternative approach to providing the full set of required functions from one hand operating the computer mouse could be to use a computer mouse with additional buttons beyond the standard left and right buttons mapped to the respective command modes. However, the use of a computer mouse having additional buttons disadvantageously requires more complex hardware and more complex and less ergonomic user interaction.

BRIEF SUMMARY

A method, apparatus and computer program product are provided according to an example embodiment in order to facilitate the manipulation of medical images, such as the medical images displayed by a PACS workstation. In this regard, the method, apparatus and computer program product of an example embodiment may provide for the control of various image manipulation operations utilizing a touch sensitive device, such as touch sensitive mouse, in a manner that is intuitive to user and in a manner that allows the image manipulation operations to be performed in an efficient fashion. For example, the method, apparatus and computer program product may permit the control of a plurality of image manipulation operations including, for example, multivariable image manipulation operations and single-variable image manipulation operations, utilizing a touch sensitive input device, such as a touch sensitive mouse, that may be operated with a single hand, thereby freeing the other hand of the user to operate, for example, a speech microphone.

In one embodiment, a method of manipulating medical images is provided that includes determining a position of a user's hand upon a touch sensitive input device. In this regard, determining the position may include detecting an instance in which the user's hand is in a first position upon the touch sensitive input device and detecting an instance in which the user's hand is in a second position, different than the first position, upon the touch sensitive input device. In an instance in which the user's hand is determined to be in the first position, the method of this embodiment also includes enabling a first image manipulation mode in which a first image manipulation operation is enabled and interpreting a first type of input to be directing the first image manipulation operation. However, in an instance in which the user's hand is determined to be in the second position, the method includes enabling a second image manipulation mode in which a second image manipulation operation, different than the first image manipulation operation, is enabled and interpreting the first type of input to be directing the second image manipulation operation instead of the first image manipulation operation.

The first and second image manipulation operations may include first and second multivariable image manipulation operations, respectively. For example, the first and second multivariable image manipulation operations may include a move image to or from a viewport operation and a pan operation, respectively. In another embodiment, the first and second image manipulation operations may include first and second single variable image manipulation operations, respectively. For example, the first and second single variable image manipulation operations may include a scroll operation and a zoom operation, respectively. In one embodiment, enabling the first and second image manipulation modes includes enabling both a respective multivariable image manipulation operation and a respective single variable image manipulation operation in each of the first and second image manipulation modes.

The touch sensitive input device may be embodied by a touch sensitive mouse. As such, the method of this embodiment may determine the position of the user's hand by determining a position of a thumb of the user upon the touch sensitive mouse. In one embodiment in which the touch sensitive mouse includes a first portion proximate an underlying support surface and a second portion spaced from the support surface, the method may detect an instance in which the user's hand is in the first position by detecting an instance in which the thumb of the user rests within the first portion of the touch sensitive mouse, and the method may detect an instance in which the user's hand is in the second position by detecting an instance in which the thumb of the user rests within the second portion of the touch sensitive mouse. In accordance with one embodiment, enabling the first and second image manipulation modes may include identifying first and second modifier keys, respectively, to have been actuated.

In another embodiment, an apparatus for manipulating medical images is provided that includes a processing device configured to cause the apparatus to determine a position of a user's hand upon a touch sensitive input device. In this regard, the processing device may be configured to cause the apparatus to determine the position by detecting an instance in which the user's hand is in a first position upon the touch sensitive input device and detecting an instance in which the user's hand is in a second position, different than the first position, upon the touch sensitive input device. The processing device may be configured, in an instance in which the user's hand is determined to be in the first position, to cause the apparatus of this embodiment to enable a first image manipulation mode in which a first image manipulation operation is enabled and to interpret a first type of input to be directing the first image manipulation operation. However, the processing device may also be configured, in an instance in which the user's hand is determined to be in the second position, to cause the apparatus of this embodiment to enable a second image manipulation mode in which a second image manipulation operation, different than the first image manipulation operation, is enabled and to interpret the first type of input to be directing the second image manipulation operation instead of the first image manipulation operation.

The first and second image manipulation operations may include first and second multivariable image manipulation operations, respectively. For example, the first and second multivariable image manipulation operations may include a move image to or from a viewport operation and a pan operation, respectively. In another embodiment, the first and second image manipulation operations may include first and second single variable image manipulation operations, respectively. For example, the first and second single variable image manipulation operations may include a scroll operation and a zoom operation, respectively. In one embodiment, the processing device may be configured to cause the apparatus to enable the first and second image manipulation modes by enabling both a respective multivariable image manipulation operation and a respective single variable image manipulation operation in each of the first and second image manipulation modes.

The touch sensitive input device may be embodied by a touch sensitive mouse. As such, the processing device may be configured to cause the apparatus of this embodiment to determine the position of the user's hand by determining a position of a thumb of the user upon the touch sensitive mouse. In one embodiment in which the touch sensitive mouse includes a first portion proximate an underlying support surface and a second portion spaced from the support surface, the processing device may be configured to cause the apparatus to detect an instance in which the user's hand is in the first position by detecting an instance in which the thumb of the user rests within the first portion of the touch sensitive mouse, and to detect an instance in which the user's hand is in the second position by detecting an instance in which the thumb of the user rests within the second portion of the touch sensitive mouse. In accordance with one embodiment, the processing device may be configured to cause the apparatus to enable the first and second image manipulation modes by identifying first and second modifier keys, respectively, to have been actuated.

In a further embodiment, a computer program product for manipulating medical images is provided that includes determining a position of a user's hand upon a touch sensitive input device. In this regard, determining the position may include detecting an instance in which the user's hand is in a first position upon the touch sensitive input device and detecting an instance in which the user's hand is in a second position, different than the first position, upon the touch sensitive input device. In an instance in which the user's hand is determined to be in the first position, the method of this embodiment also includes enabling a first image manipulation mode in which a first image manipulation operation is enabled and interpreting a first type of input to be directing the first image manipulation operation. However, in an instance in which the user's hand is determined to be in the second position, the method includes enabling a second image manipulation mode in which a second image manipulation operation, different than the first image manipulation operation, is enabled and interpreting the first type of input to be directing the second image manipulation operation instead of the first image manipulation operation.

The first and second image manipulation operations may include first and second multivariable image manipulation operations, respectively. For example, the first and second multivariable image manipulation operations may include a move image to or from a viewport operation and a pan operation, respectively. In another embodiment, the first and second image manipulation operations may include first and second single variable image manipulation operations, respectively. For example, the first and second single variable image manipulation operations may include a scroll operation and a zoom operation, respectively. In one embodiment, enabling the first and second image manipulation modes includes enabling both a respective multivariable image manipulation operation and a respective single variable image manipulation operation in each of the first and second image manipulation modes.

The touch sensitive input device may be embodied by a touch sensitive mouse. As such, the method of this embodiment may determine the position of the user's hand by determining a position of a thumb of the user upon the touch sensitive mouse. In one embodiment in which the touch sensitive mouse includes a first portion proximate an underlying support surface and a second portion spaced from the support surface, the method may detect an instance in which the user's hand is in the first position by detecting an instance in which the thumb of the user rests within the first portion of the touch sensitive mouse, and the method may detect an instance in which the user's hand is in the second position by detecting an instance in which the thumb of the user rests within the second portion of the touch sensitive mouse. In accordance with one embodiment, enabling the first and second image manipulation modes may include identifying first and second modifier keys, respectively, to have been actuated.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
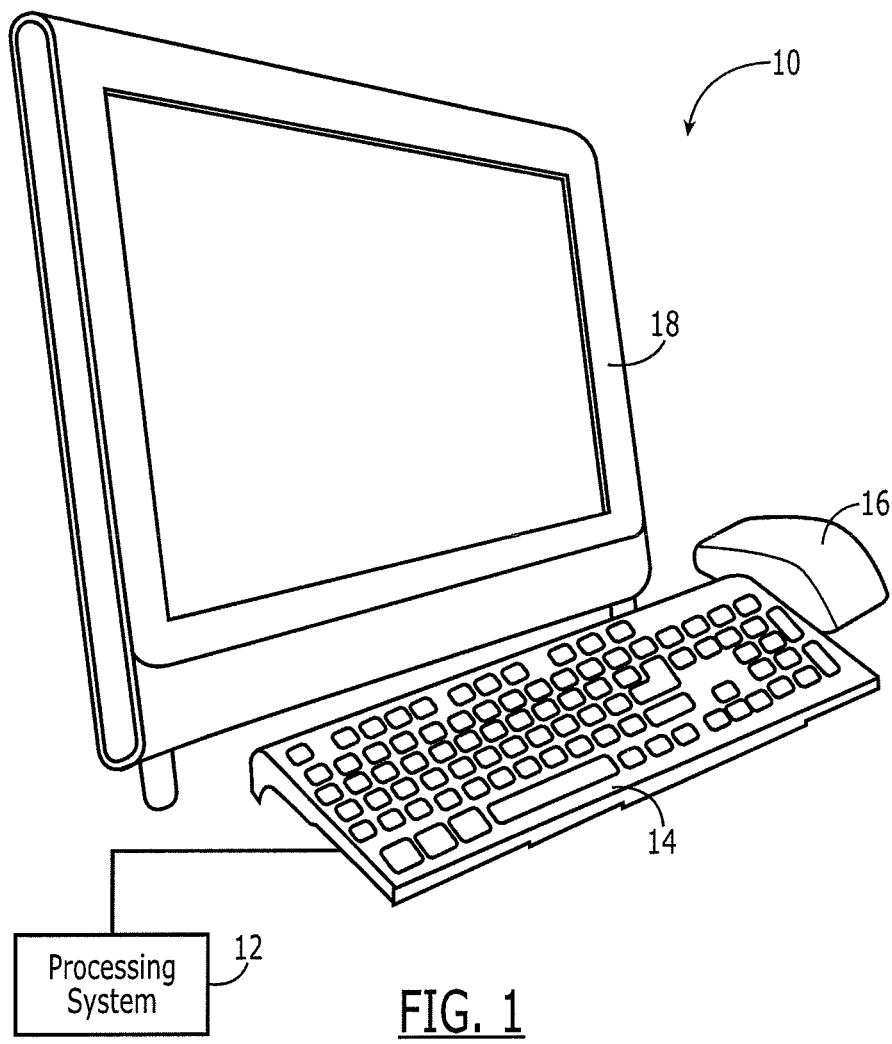
Figure 2:
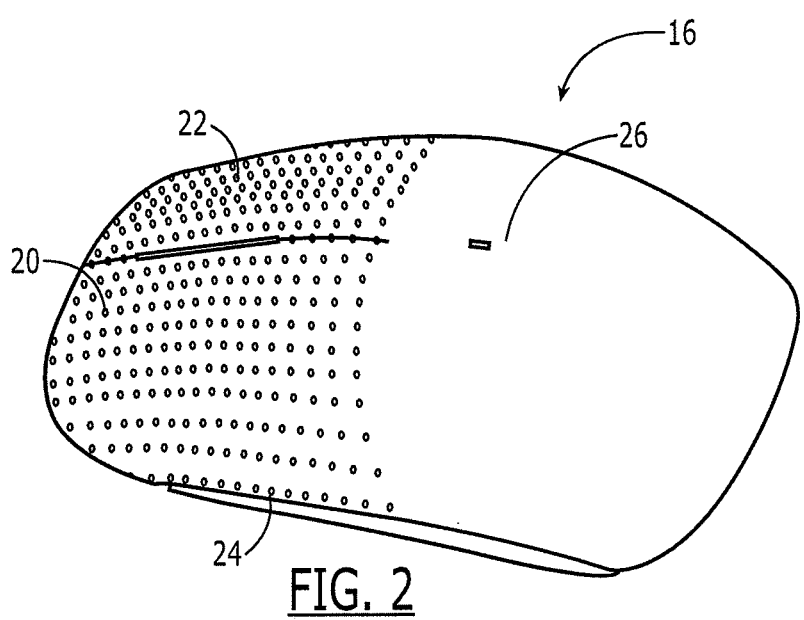
Figure 3:
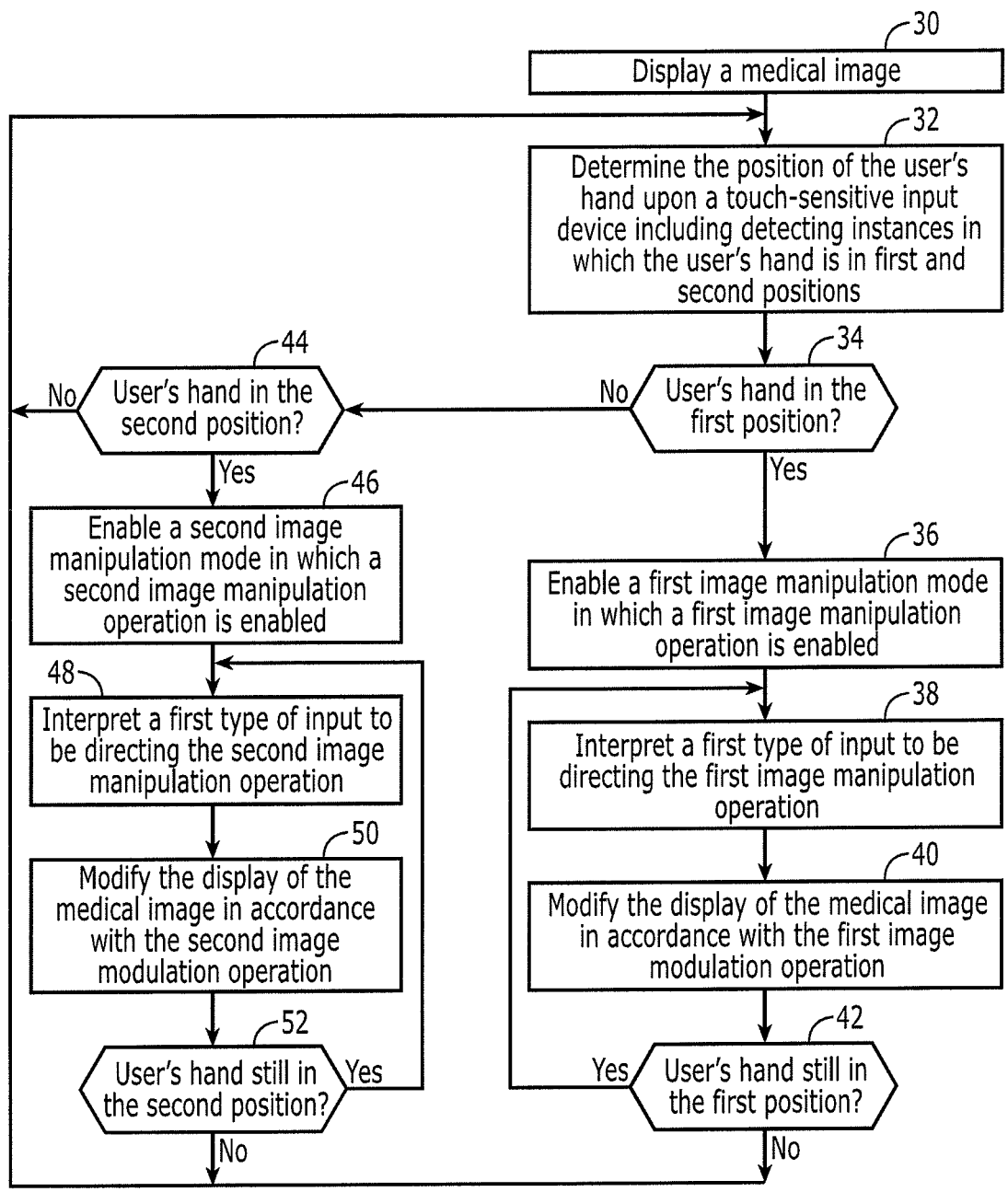
Figure 4:
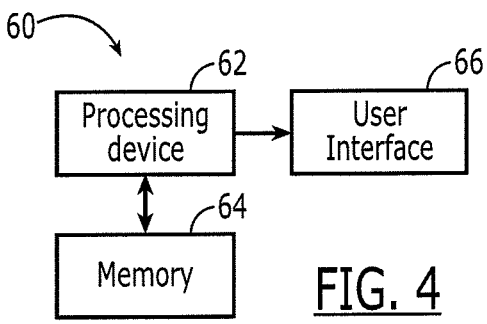
Figure 5:
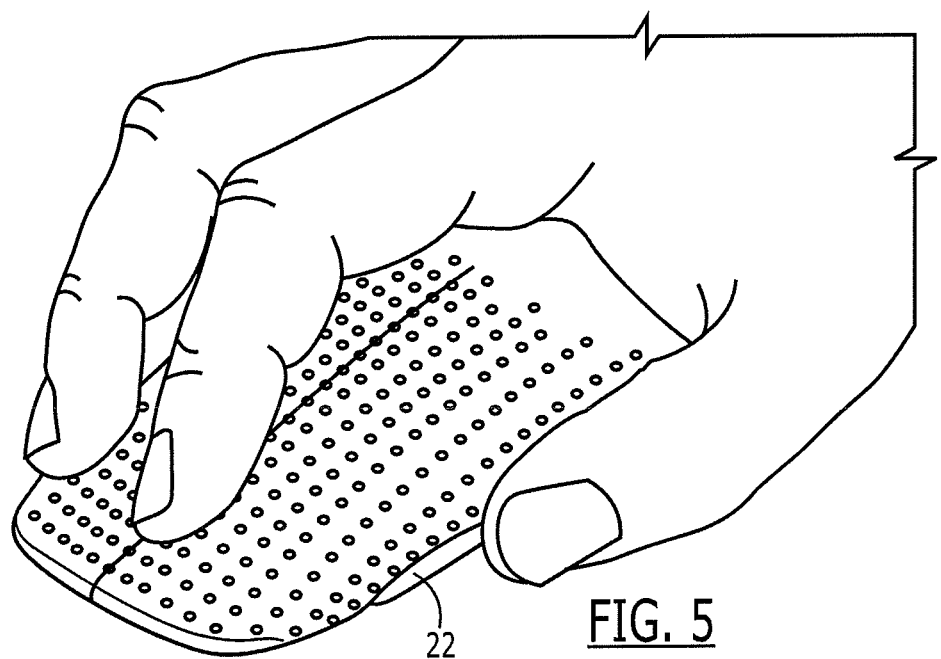
Figure 6:
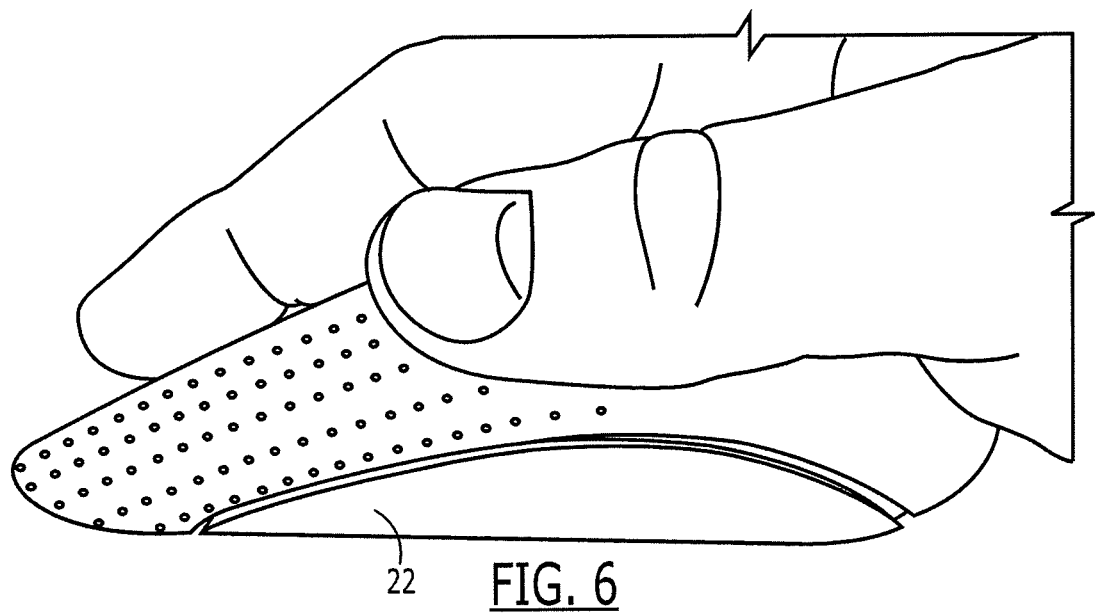
Figure 7A:
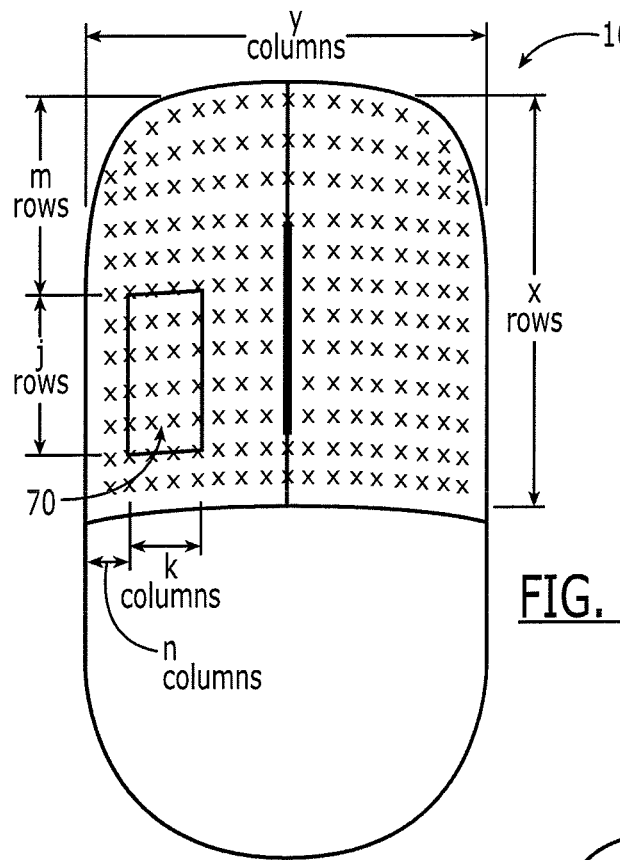
Figure 7B:
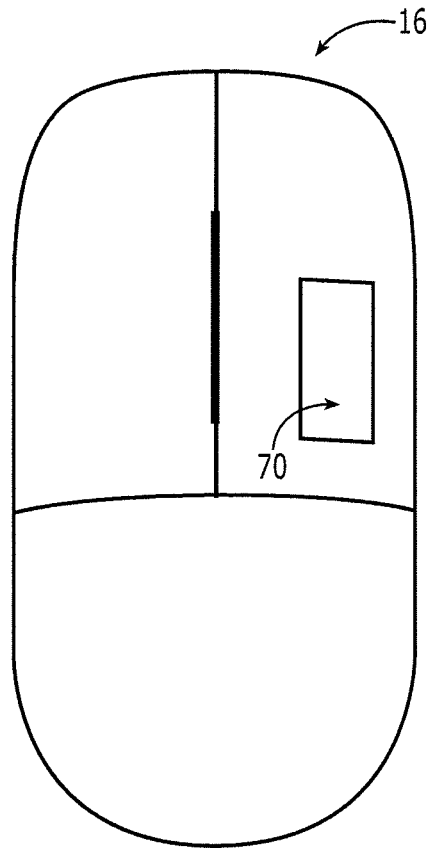

Having thus described certain embodiments of the invention in general terms, reference will now be made to the accompanying drawings, which are not necessarily drawn to scale, and wherein:

FIG. 1 illustrates a perspective view of a PACS workstation that may be specifically configured in accordance with an example embodiment of the present invention;

FIG. 2 is a perspective view of a touch sensitive mouse that may be specifically configured in order to provide input with respect to image manipulation operations in accordance with an example embodiment of the present invention;

FIG. 3 is a flowchart illustrating operations performed in accordance with an example embodiment of the present invention;

FIG. 4 is a block diagram of an apparatus that may be specifically configured in accordance with the example embodiments of the present invention;

FIG. 5 is a perspective view of a touch sensitive mouse with the user's hand in a first position;

FIG. 6 is a side view of a touch sensitive mouse with the user's hand in a second position that may be interpreted in accordance with an example embodiment of the present invention in order to provide input for image manipulation operations; and FIGS. 7A and 7B are schematic representations of a touch sensitive mouse for right and left handed operation, respectively, illustrating a region that defines a second position in which a user's thumb may be placed in order to provide input for image manipulation operations in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Further, the apparatus and method of example embodiments of the present invention will be primarily described in conjunction with medical-imaging applications. It should be understood, however, that the apparatus and method may be utilized in conjunction with a variety of other applications, both in the medical industry and outside the medical industry. Like numbers refer to like elements throughout.

FIG. 1 illustrates PACS workstation 10 that may benefit from an example embodiment of the present invention. The PACS workstation of the illustrated embodiment includes a processing system 12, such as a processing device and a memory as described below in conjunction with FIG. 4, for controllably performing the various functions of the PACS workstation. The processing system may receive user input from a keyboard 14 and a touch sensitive input device, such as a touch sensitive mouse 16. The PACS workstation may also include a display 18 upon which one or more medical images are presented. Although a single PACS workstation is shown in FIG. 1, the PACS workstation of one embodiment may be in communication with a host, such as a server, as well as one or more other PACS workstations.

As described below, the touch sensitive input device may provide user input in conjunction with the positioning of a cursor upon the display of a medical image and the performance of a plurality of different image manipulation operations. As shown in FIG. 1 and, in more detail in FIG. 2, the touch sensitive input device may be a touch sensitive mouse 16, such as the TouchMouse™ device provided by Microsoft or the like. Touch sensitive input devices, such as touch sensitive computer mice, may include various types of touch sensors for detecting user input. In one example, the touch sensitive input device, such as a touch sensitive computer mouse, includes capacitive multi-touch sensors for detecting user input upon the surface or a least a portion of the surface of the touch sensitive computer mouse.

As shown in FIG. 2, a touch sensitive computer mouse 16 generally includes first and second buttons 20, 22, such as left and right mouse buttons. The touch sensitive computer mouse generally includes a first surface 24 that is proximate to an underlying support surface, such as a mouse pad, a work surface or the like, that serves to support the computer mouse and across which the computer mouse is configured to be moved. The touch sensitive computer mouse also includes a second surface 26, opposite the first surface and upon which a least a portion of the user's hand rests during use of the touch sensitive computer mouse.

Referring now to FIG. 3, the operations performed in conjunction with a PACS workstation 10 in accordance with the example embodiment of the present invention in order to receive and act upon user input in regard to image manipulation of a medical image displayed by a PACS workstation is shown. Initially, a medical image is displayed, such as upon the display 18 of a PACS workstation, as shown at block 30 of FIG. 3. As described above, various types of medical images may be displayed including medical images captured by various modalities, such as US, MR, PET, CT, MG, DR and/or CR images.

The display of a medical image as well as the other operations depicted in FIG. 3 and described below may be performed by an apparatus 60 as shown in FIG. 4. The apparatus of FIG. 4 may be embodied in various manners including, in one embodiment, by the PACS workstation with elements of the apparatus embodied by the processing system 12, the touch sensitive input device, such as the touch sensitive mouse 16, and/or the display 18. In some example embodiments, the apparatus includes various means for performing the various functions described herein. These means may include, for example, one or more of a processing system, such as a processing device 62 and a memory 64, and/or user interface 66 for performing the various functions herein described. The means of the apparatus as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory) that is executable by a suitably configured processing device (e.g., the processing device), or some combination thereof.

The processing device 62 may, for example, be embodied as various means including one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processing device, in some embodiments the processing device may comprise a plurality of processors. The plurality of processors may be embodied on a single computing device or may be distributed across a plurality of computing devices collectively configured to function as the apparatus. The plurality of processors may be in operative communication with each other and may be collectively configured to perform one or more functionalities of the apparatus 60 as described herein. In some example embodiments, the processing device is configured to execute instructions stored in the memory 64 or otherwise accessible to the processing device. These instructions, when executed by the processing device, may cause the apparatus to perform one or more of the functionalities of the apparatus as described herein. As such, whether configured by hardware or software methods, or by a combination thereof, the processing device may comprise an entity capable of performing operations according to embodiments of the present invention while configured accordingly. Thus, for example, when the processing device is embodied as an ASIC, FPGA or the like, the processing device may comprise specifically configured hardware for conducting one or more operations described herein. Alternatively, as another example, when the processing device is embodied as an executor of instructions, such as may be stored in the memory, the instructions may specifically configure the processing device to perform one or more algorithms and operations described herein.

The memory 64 may include, for example, volatile and/or non-volatile memory. Although illustrated in FIG. 4 as a single memory, the memory may comprise a plurality of memories. The plurality of memories may be embodied on a single computing device or distributed across a plurality of computing devices. The memory may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory may comprise any non-transitory computer readable storage medium. The memory may be configured to store information, data, applications, instructions, or the like for enabling the apparatus 60 to carry out various functions in accordance with example embodiments of the present invention. For example, in some example embodiments, the memory is configured to buffer input data for processing by the processing device 62. Additionally or alternatively, in some example embodiments, the memory is configured to store program instructions for execution by the processing device.

The user interface 66 may be in communication with the processing device 62 to receive an indication of a user input and/or to provide an audible, visual, mechanical, or other output to a user. In one embodiment, the user interface may include, for example, a keyboard 14 and/or a touch sensitive input device, such as a touch sensitive mouse 16, for receiving user input. The user interface may also include a display 18 for presenting medical images for review and manipulation by a user. The user interface may be in communication with the memory 64, such as via a bus. Although not shown in FIG. 4, the apparatus 60 of one embodiment may also include a communication interface for facilitating communication between a PACS workstation 10 and a host, e.g., a server, and/or one or more other PACS workstations.

Returning now to block 30 of FIG. 3, the apparatus 60 may include means, such as the user interface 66, e.g., the display 18 of the PACS workstation 10, or the like, for displaying the medical image. While the image is displayed, the user may position a cursor upon the medical image with positional input provided by the touch sensitive input device, such as by movement of the touch sensitive computer mouse 16. During the review of the medical image, the user may desire to manipulate the image in order to obtain additional information or to obtain a better view of a portion of the image. As described below and in accordance with an example embodiment of the present invention, the input that is provided in regards to manipulation of the image may be provided by means of the touch sensitive input device, such as a touch sensitive computer mouse.

As shown in block 32 of FIG. 3, the apparatus 60 may include means, such as a processing device 62, the user interface 66 or the like, for determining the position of the user's hand upon a touch sensitive input device, such as a touch sensitive computer mouse 16. In this regard, a plurality of different positions of the user's hand upon the touch sensitive computer mouse may be predefined with each position of the user's hand upon the computer mouse being associated with one or more respective image manipulation operation(s). In one embodiment, the different positions of the user's hand are predefined so as to be distinctly different positions, thereby avoiding confusion or ambiguity between the different positions. Additionally, at least one of the positions may be defined so as to be a position that is not inherently natural for the user in order to reduce the likelihood of accidental placement of the user's hand in the position and to, instead, require intentional placement by the user of their hand in the position.

While various positions may be predefined, a first position of the user's hand may be predefined as shown in FIG. 5. In this regard, the user's hand rests upon the second surface 26 of the touch sensitive computer mouse 16 with the pointer and middle fingers of the user's hand resting upon the left and right mouse buttons 20, 22. Additionally, the user's thumb is in a first position along the side of the computer mouse proximate the first surface 24 of the computer mouse, that is, proximate the underlying support surface upon which the computer mouse rests. This first position is a relatively natural position for the use. A second position may be predefined as shown in FIG. 6. In this second position, the user's hand again rests upon the second surface of the touch sensitive computer mouse with the pointer and middle fingers of the user resting upon the left and right mouse buttons, respectively. However, the user's thumb has now moved to a second position that is on or proximate to the second surface of the touch sensitive computer mouse and is spaced apart from the first surface of the touch sensitive computer mouse as well as the underlying support surface. While FIGS. 5 and 6 illustrate one example of first and second positions that may be predefined and utilized in order to identify different image manipulations operations, the method, apparatus and computer program product of other embodiments of the present invention may operate in conjunction with other types of first and second positions that may be sensed and distinguished by a touch sensitive input device, such as a touch sensitive computer mouse.

As such, the determination of the position of the user's hand upon the touch sensitive input device may include the detection of an instance in which the user's hand is in the first position and the detection of an instance in which the user's hand is in a second position, different than the first position. In an instance in which the apparatus 60, such as the processing device 62, the user interface 66 or the like, determines that the user's hand is in the first position as shown in block 34 of FIG. 3, the apparatus may include means, such as the processing device or the like, for enabling a first image manipulation mode in which a first image manipulation operation is enabled. See block 36. While different image manipulation modes may be associated with different positions of the user's hand upon a touch sensitive input device, the first image manipulation mode of one embodiment may be a mode in which image manipulation operations associated with moving one or more images to or from a viewport and/or a scrolling through a stack of images within the viewport are enabled.

As a result of enabling the first image manipulation mode, the apparatus 60 may include means, such as the processing device 62 or the like, for interpreting a first type of input to be directing the first image manipulation operation and means, such as a processing device, the user interface 66, e.g., the display 18, or the like for modifying the display of the medical image in accordance with the first image manipulation operation. See operations 38 and 40 of FIG. 3. By way of example, the first image manipulation mode may enable a first image manipulation operation, such as a first multivariable image manipulation operation, e.g., a move image to or from a viewport operation. Thus, detection of the user's hand being in the first position permits subsequent input, such as the actuation of the left mouse button 20 and movement of the mouse 16 across the support surface while the left mouse button remains actuated to be interpreted as the two-dimensional input, e.g., X and Y inputs, for a move image to or from a viewport operation. Alternatively, the first image manipulation operation may be a first single variable image manipulation operation, such as a scroll operation. In this embodiment in which the user's hand has been detected to be in the first position, the actuation of the right mouse button and subsequent movement of the wheel or stroking of the second surface of the touch sensitive computer mouse, such as in a forwardly or rearwardly direction, may provide the one-dimensional input with respect to a scroll operation. It is noted that reference herein to the left and right mouse buttons is provided from the perspective of a computer mouse designed for actuation by the right hand of the user and is provided by way of example, but not of limitation, as computer mice designed for actuation by the left hand of the user may also be employed, albeit with the actuation of the left and right mouse buttons generally being reversed.

While the user's hand remains in the first position, further input of the first type may be interpreted to be input for the first image manipulation operation in the first image manipulation mode. See block 42 of FIG. 3. In one embodiment, the first image manipulation mode may enable both a first multivariable manipulation operation and a first single variable manipulation operation. Thus, the positioning of the user's hand in the first position and the actuation of the left computer mouse button 20 may provide for manipulation of the image in accordance with a move image to or from a viewport operation in an instance in which the mouse 16 is moved so as to provide the multivariable input desired for the move image to or from a viewport operation and in accordance with a scroll operation in an instance in which the wheel is rotated or a stroking input is provided upon the second surface 26 so as to provide the single variable input desired for the scroll operation.

Alternatively, in an instance in which the user's hand is not in the first position, the apparatus 60 may include means, such as the processing device 62, the user interface 66 or the like, for determining whether the user's hand is in the second position as shown in block 44 of FIG. 3. In an instance in which the user's hand is determined to be in the second position, the apparatus may include means, such as the processing device or the like, for enabling a second image manipulation mode in which a second image manipulation operation, different than the first image manipulation mode, is enabled. See block 46. While different image manipulation modes may be associated with different positions of the user's hand upon a touch sensitive input device, the second image manipulation mode of one embodiment may be a mode in which image manipulation operations associated with a panning operation and/or a zoom operation are enabled.

As a result of enabling the second image manipulation mode, the apparatus 60 may include means, such as the processing device 62 or the like, for interpreting the first type of input, that is, the same type of input described above in conjunction with the first image manipulation mode, to now be directing the second image manipulation operation and means, such as the processing device, the user interface 66, e.g., the display 18, or the like, for modifying the display of the medical image in accordance with the second image manipulation operation. See operations 48 and 50 of FIG. 3. By way of example, the second image manipulation mode may enable a second image manipulation operation, such as a second multivariable image manipulation operation, e.g., a panning operation. Thus, detection of the user's hand being in the second position permits subsequent input, such as the actuation of the left mouse button 20 and movement of the mouse 16 across the support surface while the left mouse button remains actuated to be interpreted as the two-dimensional input, e.g., X and Y inputs, for a panning operation. Alternatively, the second image manipulation operation may be a second single variable image manipulation operation, such as a zoom operation. In this embodiment in which the user's hand has been detected to be in the second position, the movement of the wheel or stroking of the second surface of the touch sensitive computer mouse, such as in a forwardly or rearwardly direction, may provide the one-dimensional input with respect to a zoom operation. As will be noted, the method, apparatus and computer program product of an example embodiment may be configured to receive the same type of input in either of the first and second image manipulation modes, but may respond differently with the second image manipulation operation(s) being different than the first image manipulation operation(s) as a result of the different positioning of the user's hand upon the touch sensitive input device.

While the user's hand remains in the second position, further input of the second type may be interpreted to be input for the second image manipulation operation in the second image manipulation mode. See block 52 of FIG. 3. In one embodiment, the second image manipulation mode may enable both a second multivariable manipulation operation and a second single variable manipulation operation. Thus, the positioning of the user's hand in the second position and the actuation of the left computer mouse button 20 may provide for manipulation of the image in accordance with a panning operation in an instance in which the mouse 16 is moved so as to provide the multivariable input desired for the panning operation and in accordance with a zoom operation in an instance in which the wheel is rotated or a stroking input is provided upon the second surface 26 so as to provide the single variable input desired for the zoom operation.

By permitting different image manipulation modes to be enabled and to correspondingly permit different image manipulation operations to be enabled, depending upon the position of the user's hand upon a touch sensitive input device, such as a touch sensitive computer mouse 16, a user may provide input for a variety of different image manipulation operations utilizing only a touch sensitive input device, such as a touch sensitive computer mouse, without need for actuation of various shortcut modifier keys or the selection of various radio buttons. As such, the input provided for the various image manipulation operations in accordance with an example embodiment may be more intuitive and does not require awkward movement and/or does not interrupt the user's use of a speech microphone.

Various types of touch sensitive input devices may be utilized, including, for example, touch sensitive computer mice 16. In one embodiment, a touch sensitive computer mouse includes an array of touch sensors in the region of the touch sensitive computer mouse upon which the user's fingers will lie. As shown, for example, in FIGS. 7A and 7B which illustrate touch sensitive computer mice configured for right-handed and left-handed use, respectively, an array of touch sensors having x rows of touch sensors and y columns of touch sensors is illustrated with each touch sensor being represented by an X. In this embodiment, a region 70 is defined that includes one more predefined touch sensors. Although the region may have various sizes and locations subject to being aligned with the user's thumb in the second position, the region of the illustrated embodiment has j rows and k columns of touch sensors and is offset by m rows of touch sensors from the forward edge of the computer mouse and n columns of touch sensors from the leftmost edge of the computer mouse.

The region 70 is associated with a respective position of the user's hand, such as the second position of the user's hand. As such, in an instance in which the second position of the user's hand includes the positioning of the user's thumb in a second position proximate the second surface 26 of the computer mouse 16 and spaced apart from the first surface 24 of the computer mouse and the underlying support surface, the region 70 of touch sensors may be defined to include the plurality of touch sensors that will be contacted by the user's thumb while in the second position. In order to definitively indicate the second position, the region 70 of touch sensors is also advantageously positioned so as not to be contacted while the user's hand is in the first position.

As such, in an instance in which the user's thumb is detected to be within the region 70, the user's hand is determined to be in the second position. Conversely, in an instance in which the user's thumb is not detected to be within the region 70, the user's hand may be determined to be in the first position. Alternatively, another region of predefined sensors may be defined proximate the first surface 24 of the computer mouse 16 with the user's thumb lying within the other region being indicative of the user's hand being in the first position. While the touch sensitive computer mouse of FIG. 7A is designed for the use of a right handed person with the user's thumb and the corresponding region 70 defining the second position of the user's hand being on the left side of the computer mouse, a touch sensitive computer mouse designed for operation with the left hand of the user with the user's thumb being on the right side of the computer mouse and the corresponding region 70 defining the second position of the user's hand also being on the right side of the computer mouse may be similarly configured as shown in FIG. 7B.

In order to reduce the likelihood that an image manipulation mode will be inadvertently selected, the apparatus 60, such as the processing device 62, may incorporate a predefined or user configurable delay, such as 0.5 seconds. As such, upon detecting that the user's hand has transitioned to a different position, such as the second position, the apparatus may not immediately enable the image manipulation mode associated with the different position. Instead, the apparatus, such as the processing device, may monitor the position of the user's hand and may only enable the image manipulation mode associated with the different position once user's hand has remained in the different position continuously for a period of time at least equal to the predefined or configurable delay.

Although the image manipulation mode that is enabled may be based upon the position of the user's hand as described above, the method, apparatus and computer program product of other embodiments may utilize other types of input provided via a touch sensitive input device, such as a touch sensitive mouse 16, to define the image manipulation mode that is to be enabled. For example, a forward and/or backward stroke with two or more fingers across the second surface 26 of a computer mouse may indicate that a zoom operation is to be enabled, while a forward and/or backward stroke with a single finger across the second surface of the computer mouse may indicate that a scroll operation is to be enabled. Additionally or alternatively, a double tap upon the second surface of the computer mouse may enable the panning operation with a subsequent movement of the finger over the second surface causing the image to be panned.

As described above, FIG. 3 illustrates a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a PACS workstation 10, a processing system 12 or other computing device and executed by a processing device (e.g., the processing device 62). In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowchart support combinations of means for performing the specified functions and combinations of steps for performing the specified functions. It will also be understood that one or more blocks of the flowchart, and combinations of blocks in the flowchart, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processing device 62 may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of manipulating medical images, the method comprising:
   determining a position of a user's hand upon a touch sensitive input device comprising a touch sensitive mouse by determining a position of a thumb of the user upon the touch sensitive mouse, wherein the touch sensitive mouse comprises a first portion proximate an underlying support surface and a second portion spaced from the support surface, wherein determining the position comprises detecting an instance in which the user's hand is in a first position upon the touch sensitive input device in which the thumb of the user rests within the first portion of the touch sensitive mouse and detecting an instance in which the user's hand is in a second position, different than the first position, upon the touch sensitive input device in which the thumb of the user rests within the second portion of the touch sensitive mouse;
   in an instance in which the user's hand is determined to be in the first position, enabling a first image manipulation mode in which a first multivariable image manipulation operation and a first single variable image manipulation operation are enabled and interpreting a first type of input to be directing a respective one of the first multivariable image manipulation operation or the first single variable image manipulation operation depending upon the type of input provided while the user's hand is in the first position upon the touch sensitive input device; and
   in an instance in which the user's hand is determined to be in the second position, enabling a second image manipulation mode in which a second multivariable image manipulation operation and a second single variable image manipulation operation, different than the first multivariable image manipulation operation and the first single variable image manipulation operation, are enabled and interpreting the first type of input to be directing a respective one of the second multivariable image manipulation operation or the second single variable image manipulation operation, instead of the first multivariable image manipulation operation or the first single variable image manipulation operation, depending upon the type of input provided while the user's hand is in the second position upon the touch sensitive input device,
   wherein the first and second multivariable image manipulation operations are directed in response to input comprising movement of the touch sensitive input device and depressing one or more buttons of the touch sensitive input device, and wherein the first and second single variable image manipulation operations are directed in response to input comprising rotation of a scroll wheel of the touch sensitive input device or stroking of the touch sensitive input device.

2. A method according to claim 1 wherein the first and second multivariable image manipulation operations comprise a move image to or from a viewport operation and a pan operation, respectively.

3. A method according to claim 1 wherein the first and second single variable image manipulation operations comprise a scroll operation and a zoom operation, respectively.

4. A method according to claim 1 wherein enabling the first and second image manipulation modes comprises enabling both a respective multivariable image manipulation operation and a respective single variable image manipulation operation in each of the first and second image manipulation modes.

5. A method according to claim 1 wherein enabling the first and second image manipulation modes comprises identifying first and second modifier keys, respectively, to have been actuated.

6. A method according to claim 1 wherein the first multivariable image manipulation operation and the first single variable image manipulation comprise a move image to or from a viewport operation and scroll through a plurality of images within the viewport operation, respectively, and wherein the second multivariable image manipulation operation and the second single variable image manipulation comprise a pan operation and a zoom operation, respectively.

7. An apparatus for manipulating medical images, the apparatus comprising a processing device configured to cause the apparatus to:
   determine a position of a user's hand upon a touch sensitive input device comprising a touch sensitive mouse by determining a position of a thumb of the user upon the touch sensitive mouse, wherein the touch sensitive mouse comprises a first portion proximate an underlying support surface and a second portion spaced from the support surface, wherein determining the position comprises detecting an instance in which the user's hand is in a first position upon the touch sensitive input device in which the thumb of the user rests within the first portion of the touch sensitive mouse and detecting an instance in which the user's hand is in a second position, different than the first position, upon the touch sensitive input device in which the thumb of the user rests within the second portion of the touch sensitive mouse;
   in an instance in which the user's hand is determined to be in the first position, enable a first image manipulation mode in which a first multivariable image manipulation operation and a first single variable image manipulation operation are enabled and interpret a first type of input to be directing a respective one of the first multivariable image manipulation operation or the first single variable image manipulation operation depending upon the type of input provided while the user's hand is in the first position upon the touch sensitive input device; and
   in an instance in which the user's hand is determined to be in the second position, enable a second image manipulation mode in which a second multivariable image manipulation operation and a second single variable image manipulation operation, different than the first multivariable image manipulation operation and the first single variable image manipulation operation, are enabled and interpret the first type of input to be directing a respective one of the second multivariable image manipulation operation or the second single variable image manipulation operation instead of the first multivariable image manipulation operation or the first single variable image manipulation operation, depending upon the type of input provided while the user's hand is in the second position upon the touch sensitive input device,
   wherein the first and second multivariable image manipulation operations are directed in response to input comprising movement of the touch sensitive input device and depressing one or more buttons of the touch sensitive input device, and wherein the first and second single variable image manipulation operations are directed in response to input comprising rotation of a scroll wheel of the touch sensitive input device or stroking of the touch sensitive input device.

8. An apparatus according to claim 7 wherein the first and second multivariable image manipulation operations comprise a move image to or from a viewport operation and a pan operation, respectively.

9. An apparatus according to claim 7 wherein the first and second single variable image manipulation operations comprise a scroll operation and a zoom operation, respectively.

10. An apparatus according to claim 7 wherein the processing device is configured to cause the apparatus to enable the first and second image manipulation modes by enabling both a respective multivariable image manipulation operation and a respective single variable image manipulation operation in each of the first and second image manipulation modes.

11. An apparatus according to claim 7 wherein the processing device is configured to cause the apparatus to enable the first and second image manipulation modes by identifying first and second modifier keys, respectively, to have been actuated.

12. An apparatus according to claim 7 wherein the first multivariable image manipulation operation and the first single variable image manipulation comprise a move image to or from a viewport operation and scroll through a plurality of images within the viewport operation, respectively, and wherein the second multivariable image manipulation operation and the second single variable image manipulation comprise a pan operation and a zoom operation, respectively.

13. A computer program product for manipulating medical images, the computer program product comprising at least one non-transitory computer-readable storage medium having stored therein program instructions for:

determining a position of a user's hand upon a touch sensitive input device comprising a touch sensitive mouse by determining a position of a thumb of the user upon the touch sensitive mouse, wherein the touch sensitive mouse comprises a first portion proximate an underlying support surface and a second portion spaced from the support surface, wherein determining the position comprises detecting an instance in which the user's hand is in a first position upon the touch sensitive input device in which the thumb of the user rests within the first portion of the touch sensitive mouse and detecting an instance in which the user's hand is in a second position, different than the first position, upon the touch sensitive input device in which the thumb of the user rests within the second portion of the touch sensitive mouse;

in an instance in which the user's hand is determined to be in the first position, enabling a first image manipulation mode in which a first multivariable image manipulation operation and a first single variable image manipulation operation are enabled and interpreting a first type of input to be directing a respective one of the first multivariable image manipulation operation or the first single variable image manipulation operation depending upon the type of input provided while the user's hand is in the first position upon the touch sensitive input device; and in an instance in which the user's hand is determined to be in the second position, enabling a second image manipulation mode in which a second multivariable image manipulation operation and a second single variable image manipulation operation, different than the first multivariable image manipulation operation and the first single variable image manipulation operation, are enabled and interpreting the first type of input to be directing a respective one of the second multivariable image manipulation operation or the second single variable image manipulation operation instead of the first multivariable image manipulation operation or the first single variable image manipulation operation, depending upon the type of input provided while the user's hand is in the second position upon the touch sensitive input device, wherein the first and second multivariable image manipulation operations are directed in response to input comprising movement of the touch sensitive input device and depressing one or more buttons of the touch sensitive input device, and wherein the first and second single variable image manipulation operations are directed in response to input comprising rotation of a scroll wheel of the touch sensitive input device or stroking of the touch sensitive input device.

14. A computer program product according to claim 13 wherein enabling the first and second image manipulation modes comprises enabling both a respective multivariable image manipulation operation and a respective single variable image manipulation operation in each of the first and second image manipulation modes.

15. A computer program product according to claim 13 wherein the first multivariable image manipulation operation and the first single variable image manipulation comprise a move image to or from a viewport operation and scroll through a plurality of images within the viewport operation, respectively, and wherein the second multivariable image manipulation operation and the second single variable image manipulation comprise a pan operation and a zoom operation, respectively.

* * * * *